United States Patent
Bai et al.

(10) Patent No.: US 9,671,872 B2
(45) Date of Patent: Jun. 6, 2017

(54) GESTURE RECOGNITION METHOD, GESTURE RECOGNITION SYSTEM, TERMINAL DEVICE AND WEARABLE DEVICE

(71) Applicant: BOE TECHNOLOGY GROUP CO., LTD., Beijing (CN)

(72) Inventors: Jinglu Bai, Beijing (CN); Xingxing Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 33 days.

(21) Appl. No.: 14/801,953

(22) Filed: Jul. 17, 2015

(65) Prior Publication Data
US 2016/0202766 A1     Jul. 14, 2016

(30) Foreign Application Priority Data
Jan. 9, 2015    (CN) .......................... 2015 1 0011687

(51) Int. Cl.
*G06F 3/01*    (2006.01)
*G06F 1/16*    (2006.01)

(52) U.S. Cl.
CPC .............. *G06F 3/017* (2013.01); *G06F 1/163* (2013.01)

(58) Field of Classification Search
CPC ...... G06F 3/017; G06F 1/163; H04N 13/0239
See application file for complete search history.

(56) References Cited

U.S. PATENT DOCUMENTS

| | | | | |
|---|---|---|---|---|
| 2015/0131855 A1* | 5/2015 | Hanzawa | .............. | G06F 3/0304 382/103 |
| 2015/0169062 A1* | 6/2015 | Park | ........................ | G06F 3/017 345/156 |
| 2016/0179087 A1* | 6/2016 | Lee | ....................... | G05B 19/418 700/9 |

* cited by examiner

*Primary Examiner* — Abbas Abdulselam
(74) *Attorney, Agent, or Firm* — Harness, Dickey & Pierce, P.L.C.

(57) ABSTRACT

The present disclosure provides a gesture recognition method, a gesture recognition system, a terminal device and a wearable device. The gesture recognition method includes: collecting action information about a user; recognizing the action information; inquiring an action instruction corresponding to the recognized action information from a personal action database of the user, a correspondence between the action information about the user and the action instruction being stored in the personal action database of the user; and executing an operation corresponding to the inquired action instruction.

16 Claims, 9 Drawing Sheets

GESTURE RECOGNITION METHOD, GESTURE RECOGNITION SYSTEM, TERMINAL DEVICE AND WEARABLE DEVICE

CROSS-REFERENCE TO RELATED APPLICATION

The present application claims a priority of the Chinese patent application No. 201510011687.3 filed on Jan. 9, 2015, which is incorporated herein by reference in its entirety.

TECHNICAL FIELD

The present disclosure relates to the field of gesture recognition, in particular to a gesture recognition method, a gesture recognition system, a terminal device and a wearable device.

BACKGROUND

Through gesture recognition, it is able for users to directly interact with surrounding terminal devices using their body actions, without any need to provide a complex control device, thereby to improve the user experience.

For an existing gesture recognition device, instruction definitions represented by action information are not the same, and when the user selects a device of a different brand or select different applications, it is required to readjust himself to new standard actions, which thus results in great inconvenience. For example, when action instructions A and B for browser-based applications represent "back", the action information corresponding to A may mean "drawing a line to the left←", while the action information corresponding to B may mean "drawing a line counterclockwise". Hence, the possibility of misoperation made by the user will be increased remarkably due to the unfamiliar applications. In addition, with respect to an identical gesture, different users have different habits, and in order to recognize the gesture accurately, usually each user is required to make the action in a relatively standard and uniform manner. As a result, the user experience will be adversely affected.

SUMMARY

An object of the present disclosure is to provide a gesture recognition method, a gesture recognition system, a terminal device and a wearable device, so as to enable a user to perform an action instruction with a familiar action no matter how an action corresponding to the action instruction is defined in an application, thereby to improve the user experience.

In one aspect, the present disclosure provides in one embodiment a gesture recognition method, including:

a collection step of collecting action information about a user;

a gesture recognition step of recognizing the action information;

an inquisition step of inquiring an action instruction corresponding to the recognized action information from a personal action database of the user, a correspondence between the action information about the user and the action instruction being stored in the personal action database of the user; and an execution step of executing an operation corresponding to the inquired action instruction.

Alternatively, prior to the inquisition step, the method further includes creating the personal action database of the user.

Alternatively, information about an application type is further stored in the personal action database of the user, and for different application types, the same action information about the user corresponds to different action instructions.

Prior to the inquisition step, the method further includes acquiring the information about a type of an application used by the user. The inquisition step includes inquiring the action instruction corresponding to the recognized action information from the personal action database of the user in accordance with the information about the application type.

Alternatively, the personal action database of the user is stored in a wearable device, and the inquisition step is executed by the wearable device.

Alternatively, the collection step, the gesture recognition step and the execution step are executed by a terminal device. Subsequent to the gesture recognition step and prior to the inquisition step, the method further includes transmitting by the terminal device the recognized action information to the wearable device. Subsequent to the inquisition step and prior to the execution step, the method further includes transmitting by the wearable device the inquired action instruction to the wearable device.

In another aspect, the present disclosure provides in one embodiment a gesture recognition system, including:

a collection module configured to collect action information about a user;

a gesture recognition module configured to recognize the action information;

an inquisition module configured to inquire an action instruction corresponding to the recognized action information from a personal action database of the user, a correspondence between the action information about the user and the action instruction being stored in the personal action database of the user; and an execution module configured to execute an operation corresponding to the inquired action instruction.

Alternatively, the gesture recognition system further includes a creation module configured to create the personal action database of the user.

Alternatively, information about an application type is further stored in the personal action database of the user, and for different application types, the same action information about the user corresponds to different action instructions. The gesture recognition system further includes an application type acquisition module configured to acquire information about a type of an application used by the user. The inquisition module is further configured to inquire the action instruction corresponding to the recognized action information from the personal action database of the user in accordance with the information about the application type.

Alternatively, the inquisition module is arranged within a wearable device.

Alternatively, the collection module, the gesture recognition module and the execution module are arranged within a terminal device. The terminal device further includes a primary communication module, and the wearable device further includes a secondary communication module. The primary communication module is configured to transmit the recognized action information to the secondary communication module, and the secondary communication module is configured to receive the recognized action information from the primary communication module and transmit the inquired action instruction to the primary communication module.

Alternatively, the inquisition module and the collection module are arranged within a wearable device.

Alternatively, the gesture recognition module and the execution module are arranged within a terminal device. The terminal device further includes a primary communication module, and the wearable device further includes a secondary communication module. The primary communication module is configured receive the action information from the secondary communication module, transmit the recognized action information to the secondary communication module, and receive the inquired action instruction from the secondary communication module. The secondary communication module is configured to transmit the collected action information to the primary communication module, receive the recognized action information from the primary communication module, and transmit the inquired action instruction to the primary communication. The execution module is connected to the primary communication module and configured to execute the operation corresponding to the inquired action instruction.

Alternatively, the collection module, the gesture recognition module and the inquisition module are arranged within a wearable device.

Alternatively, the execution module is arranged within a terminal device. The terminal device further includes a primary communication module, and the wearable device further includes a secondary communication module. The primary communication module is configured receive the inquired action instruction from the secondary communication module. The secondary communication module is configured to transmit the action instruction inquired by the inquisition module to the primary communication module. The execution module is connected to the primary communication module and configured to execute the operation corresponding to the inquired action instruction.

In yet another aspect, the present disclosure provides in one embodiment a terminal device, including:

a collection module configured to collect action information about a user;

a gesture recognition module configured to recognize the action information;

a primary communication module configured to transmit the recognized action information to a wearable device worn by the user so as to enable the wearable device to inquire an action instruction corresponding to the recognized action information from a personal action database of the user, a correspondence between the action information about the user and the action instruction being stored in the personal action database of the user; and an execution module configured to receive the inquired action instruction from the wearable device, and execute an operation corresponding to the action instruction.

In still yet another aspect, the present disclosure provides in one embodiment a wearable device, including:

a secondary communication module configured to receive recognized action information about a user from a terminal device; and an inquisition module configured to inquire an action instruction corresponding to the recognized action information from a personal action database of the user, a correspondence between the action information about the user and the action instruction being stored in the personal action database of the user.

The secondary communication module is further configured to transmit the inquired action instruction to the terminal device so as to enable the terminal device to execute an operation corresponding to the action instruction.

According to the embodiments of the present disclosure, the action instruction corresponding to the action information about the user is defined in the personal action database, so when an operation on the application is made by the user with a gesture, it is able for the user to execute the action instruction with his familiar action no matter how an action corresponding to the action instruction is defined in the application, thereby to improve the user experience.

BRIEF DESCRIPTION OF THE DRAWINGS

FIG. 9 is still yet another schematic view showing the gesture recognition system according to one embodiment of the present disclosure.

DETAILED DESCRIPTION

In order to make the objects, the technical solutions and the advantages of the present disclosure more apparent, the present disclosure will be described hereinafter in conjunction with the drawings and embodiments.

Figure 1:
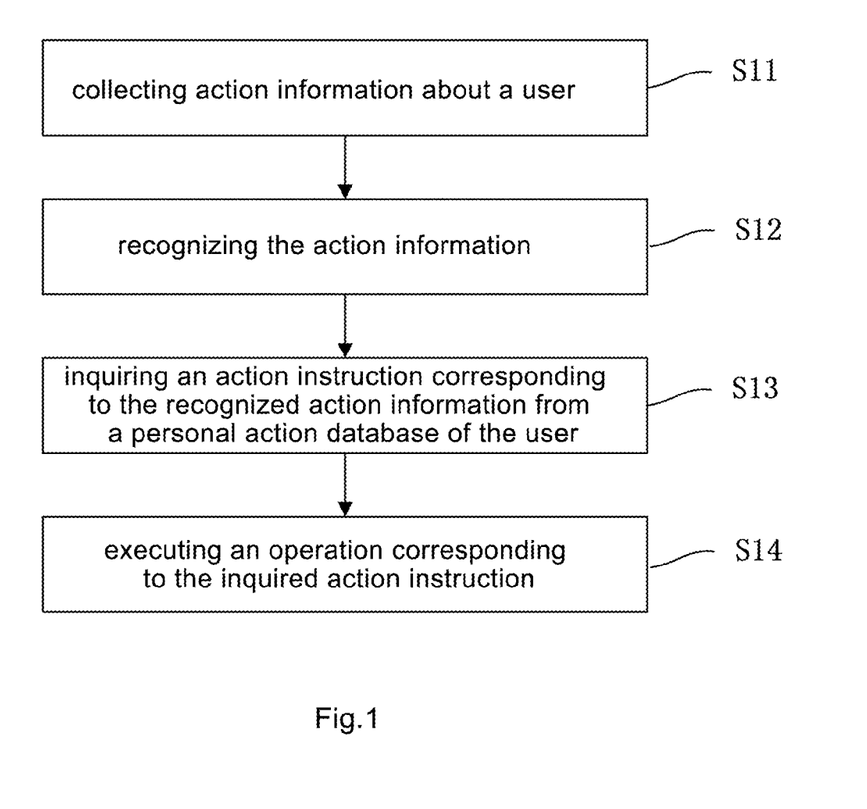
FIG. 1 is a flow chart of a gesture recognition method according to one embodiment of the present disclosure.

Referring to FIG. 1, the present disclosure provides in one embodiment a gesture recognition method which includes the following steps.

Collection step S11: collecting action information about a user. To be specific, the action information may include various gestures or actions made by a user's hand, a combination of user's hand and arm, or any other parts of a user's body (e.g., head or leg). For example, it may include a stationary action (one gesture) and/or a dynamic action (consisting of a series of gestures executed continuously).

Gesture recognition step S12: recognizing the action information.

Inquisition step S13: inquiring an action instruction corresponding to the recognized action information from a personal action database of the user, a correspondence between the action information about the user and the action instruction being stored in the personal action database of the user.

Execution step S14: executing an operation corresponding to the inquired action instruction.

At the gesture recognition step S12, the action information about the user collected at step S11 may be recognized by an existing gesture recognition method. Taking the gesture recognition method adopted by a KINECT device as an example, when an arm action is to be recognized, an image is collected by the KINECT device so as to acquire skeleton image data of a human body. Next, a mapping from a real person to a virtual person is established, and the acquired data is processed so as to acquire behaviors of an elbow and a palm. Then, a corresponding action is recognized through calculation and analysis. When a finger action is to be recognized, a depth image is acquired by the KINECT device, and a position of a hand is acquired in accordance with coordinates of the palm. Next, an appropriate region of the palm is selected, and the palm depth image is processed, so as to match the finger action with a standard gesture.

The personal action database of the user will be described hereinafter.

When an application currently used by the user is of a document reader type, the correspondences stored in the personal action database of the user may be shown in Table 1.

TABLE 1

| Action information | Action instruction |
| --- | --- |
| drawing a line to the left ← | paging down |
| drawing a line to the right → | paging up |

It should be appreciated that, in different application types, usually the action instructions represented by the same action information are different from each other. For example, for a browser-based application, the action information "drawing a line to the left" corresponds to an action instruction "back", while for a document-reader-based application, the action information "drawing a line to the left" corresponds to an action instruction "paging down".

Hence, information about application types may also be stored in the personal action database of the user, and for different application types, the same action information about the user corresponds to different action instructions.

For example, the correspondences stored in the personal action database of the user may be shown in Table 2.

TABLE 2

| Information about application type | Action information | Action instruction |
| --- | --- | --- |
| document-reader-based application | drawing a line to the left ← | paging down |
| browser-based application | drawing a line to the right → | paging up |
| | drawing a line to the left ← | back |
| | changing fingers from a gathering state to a stretching state | zoom-in |

Hence, prior to the inquisition step S13, the method may further include acquiring the information about a type of an application used by the user. The inquisition step S13 may include inquiring the action instruction corresponding to the recognized action information from the personal action database of the user in accordance with the information about the application type.

According to the embodiments of the present disclosure, subsequent to recognizing the action information about the user, the action instruction corresponding to the recognized action information may be inquired from the personal action database of the user, and then the operation corresponding to the action instruction may be executed. The action instruction corresponding to the action information about the user is defined in the personal action database, so when an operation on the application is made by the user with a gesture, it is able for the user to execute the action instruction with his familiar action no matter how an action corresponding to the action instruction is defined in the application, thereby to improve the user experience.

Alternatively, prior to the inquisition step S13, the method may further include creating the personal action database of the user.

When creating the personal action database of the user, the action information about the user may be collected, and then the action instruction corresponding to the action information may be defined, so as to generate the correspondence between the action information and the action instruction. Alternatively, the action may be learned and trained repeatedly so as to determine the action instruction corresponding to the action information, thereby to generate the correspondence between the action information and the action instruction. A known leaning and training method may be adopted, and thus it will not be particularly defined herein.

In one embodiment of the present disclosure, the personal action database of the user may be stored in a local storage device of a terminal device where a gesture recognition application is applied, or in an external storage device (e.g., a U-disk) connected to the terminal device. In addition, the collection step S11, the gesture recognition step S12, the inquisition step S13 and the execution step S14 may be executed by the terminal device. The terminal device may be a computer, a TV and so on.

Figure 2:
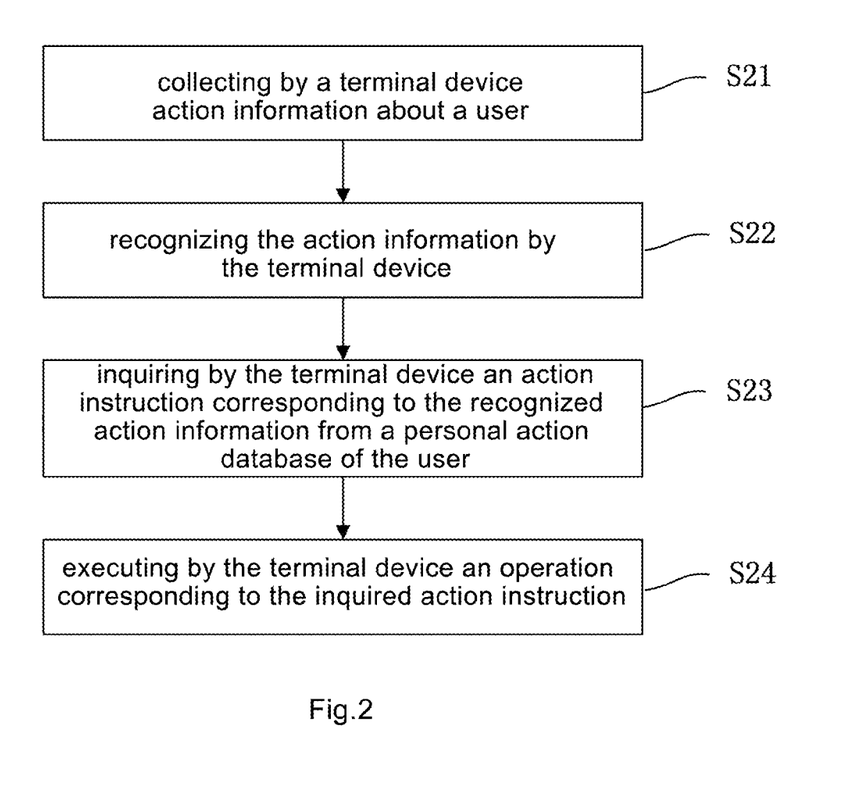
FIG. 2 is another flow chart of the gesture recognition method according to one embodiment of the present disclosure.

Referring to FIG. 2, which is another flow chart of the gesture recognition method according to one embodiment of the present disclosure, the gesture recognition method includes the following steps.

Step S21: collecting by a terminal device action information about a user. To be specific, a collection unit such as a camera or a thermal sensor arranged in, or connected to, the terminal device may be used to collect the action information about the user.

Step S22: recognizing the action information by the terminal device.

Step S23: inquiring by the terminal device an action instruction corresponding to the recognized action information from a personal action database of the user, a correspondence between the action information about the user and the action instruction being stored in the personal action database of the user.

Step S24: executing by the terminal device an operation corresponding to the inquired action instruction.

In another embodiment, the personal action database of the user may further be stored in a wearable device. Steps S11, S12, and S14 may be executed by the terminal device where a gesture recognition application is applied, and Step S13 may be executed by the wearable device.

Figure 3:
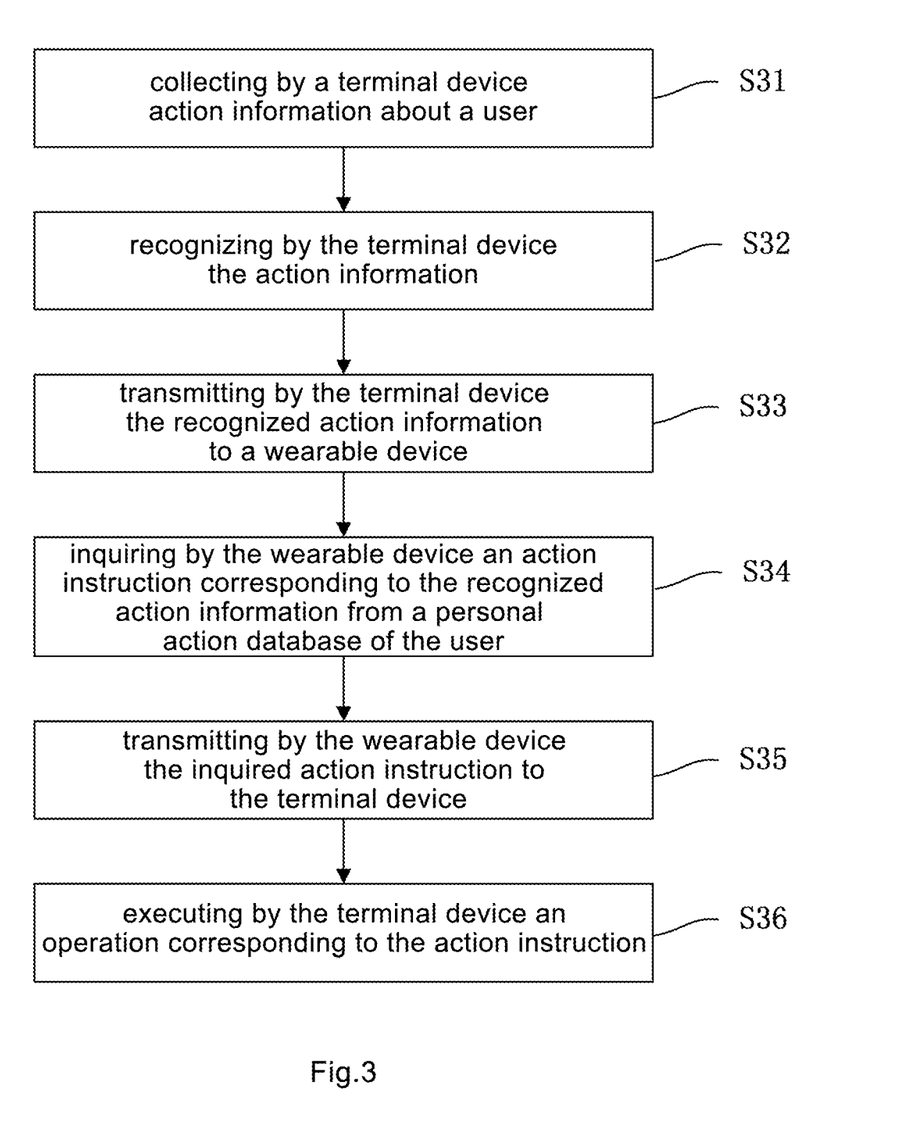
FIG. 3 is yet another flow chart of the gesture recognition method according to one embodiment of the present disclosure.

Referring to FIG. 3, which is yet another flow chart of the gesture recognition method according to one embodiment of the present disclosure, the gesture recognition method includes steps of:

Step S31: collecting by a terminal device action information about a user;

Step S32: recognizing by the terminal device the action information;

Step S33: transmitting by the terminal device the recognized action information to a wearable device;

Step S34: inquiring by the wearable device an action instruction corresponding to the recognized action information from a personal action database of the user, correspondence between the action information about the user and the action instruction being stored in the personal action database of the user;

Step S35: transmitting by the wearable device the inquired action instruction to the terminal device; and Step S36: executing by the terminal device an operation corresponding to the action instruction.

The wearable device may be an electronic device capable of being worn onto a hand or an arm of the user, such as an electronic bracelet, a smart ring or a smart armlet.

In some other embodiments of the present disclosure, apart from storing the personal action database of the user and inquiring the action instruction corresponding to the recognized action information, the wearable device may also be configured to collect user's actions, or collect and recognize the user's actions. At this time, the wearable device is provided with an action collection module for collecting the user's actions such as a sensor. When the wearable device is further configured to recognize the user's actions, it is further provided with a gesture recognition module for recognizing the collected action information.

Figure 4:
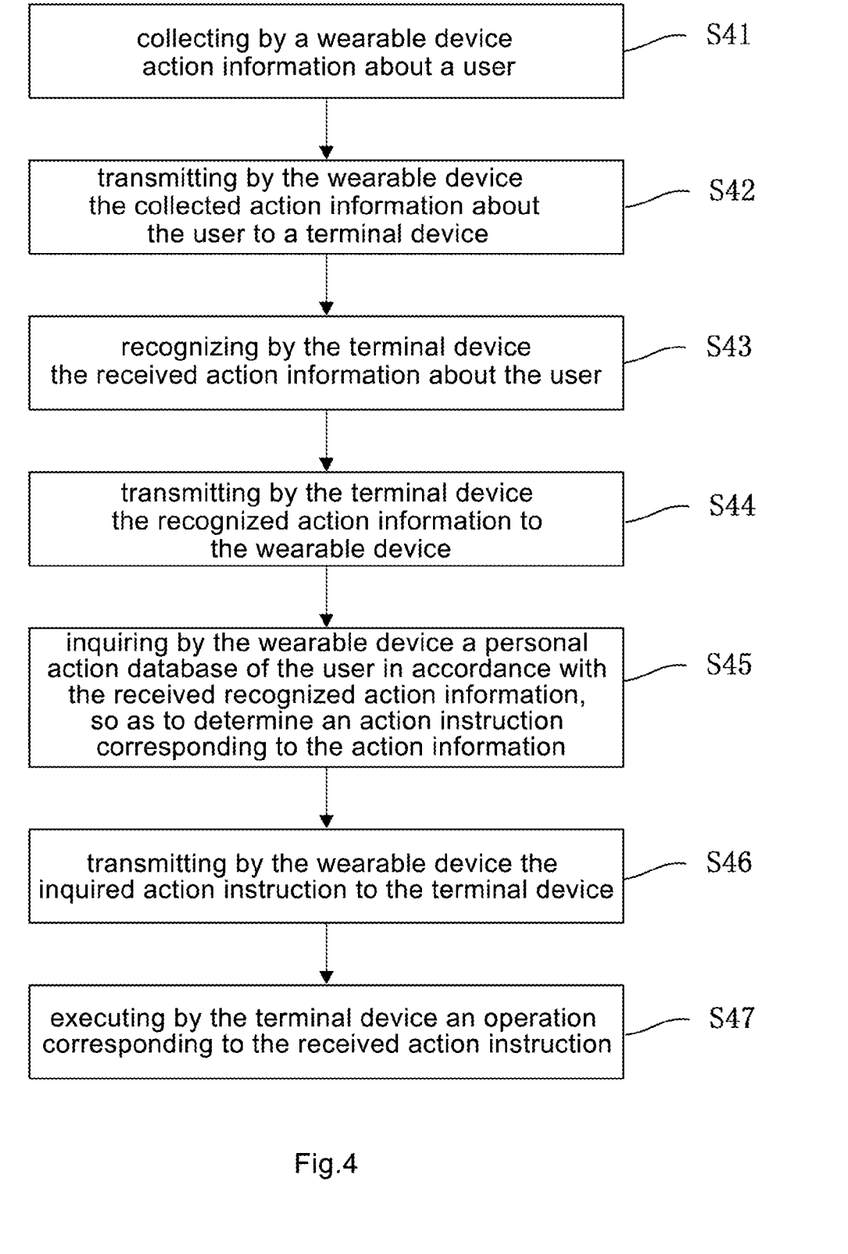
FIG. 4 is still yet another flow chart of the gesture recognition method according to one embodiment of the present disclosure.

Referring to FIG. 4, which is still yet another flow chart of the gesture recognition method according to one embodiment of the present disclosure, the gesture recognition method includes steps of:

Step S41: collecting by a wearable device action information about a user;

Step S42: transmitting by the wearable device the collected action information about the user to a terminal device;

Step S43: recognizing by the terminal device the received action information about the user;

Step S44: transmitting by the terminal device the recognized action information to the wearable device;

Step S45: inquiring by the wearable device a personal action database of the user in accordance with the received recognized action information, so as to determine an action instruction corresponding to the action information;

Step S46: transmitting by the wearable device the inquired action instruction to the terminal device; and Step S47: executing by the terminal device an operation corresponding to the received action instruction.

Figure 5:
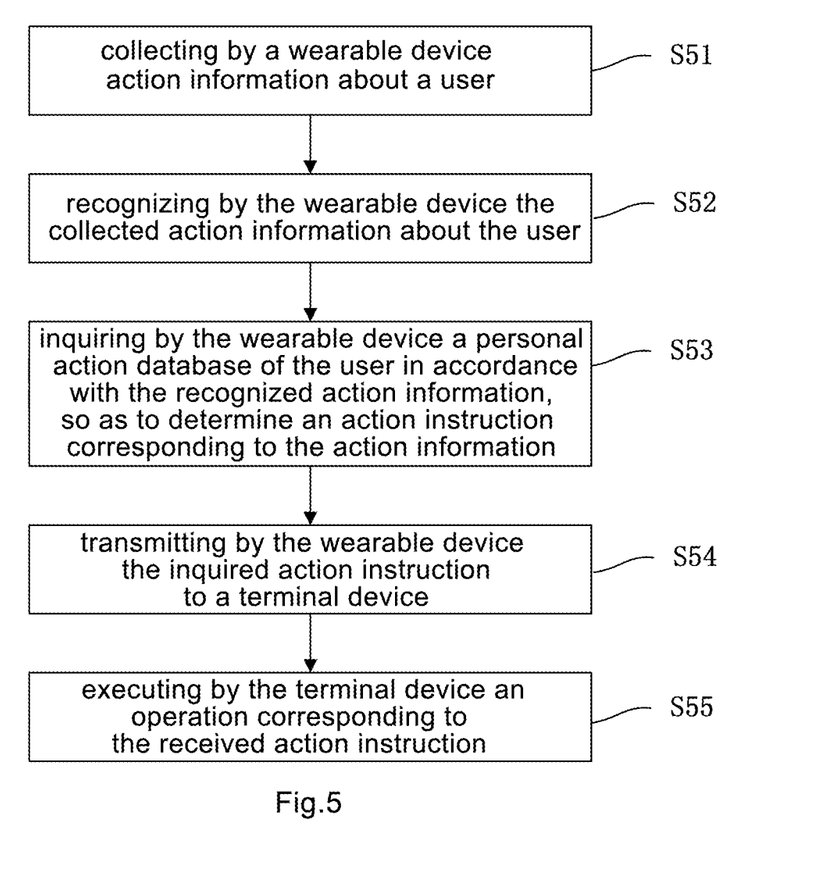
FIG. 5 is still yet another flow chart of the gesture recognition method according to one embodiment of the present disclosure.

Referring to FIG. 5, which is still yet another flow chart of the gesture recognition method according to one embodiment of the present disclosure, the gesture recognition method includes steps of:

Step S51: collecting by a wearable device action information about a user;

Step S52: recognizing by the wearable device the collected action information about the user;

Step S53: inquiring by the wearable device a personal action database of the user in accordance with the recognized action information, so as to determine an action instruction corresponding to the action information;

Step S54: transmitting by the wearable device the inquired action instruction to a terminal device; and Step S55: executing by the terminal device an operation corresponding to the received action instruction.

In the other embodiments, the personal action database of the user may also be stored in a Cloud device. Steps S11, S12 and S14 may be executed by the terminal device where a gesture recognition application is applied and Step S13 may be executed by the Cloud device.

Figure 6:
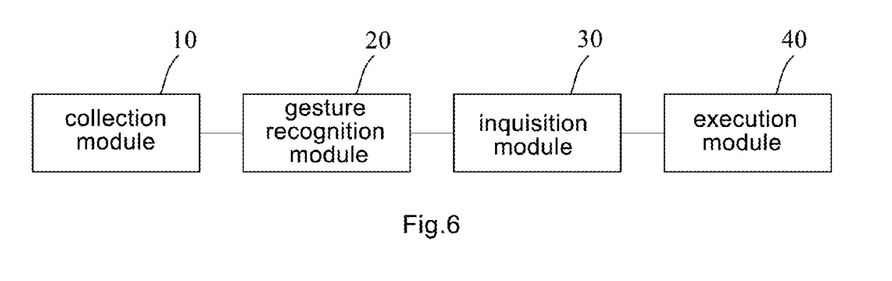
FIG. 6 is a schematic view showing a gesture recognition system according to one embodiment of the present disclosure.

Referring to FIG. 6, the present disclosure provides in one embodiment a gesture recognition system, which includes:

a collection module 10 configured to collect action information about a user;

a gesture recognition module 20 configured to recognize the action information;

an inquisition module 30 configured to inquire an action instruction corresponding to the recognized action information from a personal action database of the user, correspondence between the action information about the user and the action instruction being stored in the personal action database of the user; and an execution module 40 configured to execute an operation corresponding to the inquired action instruction.

According to this embodiment, subsequent to recognizing the action information about the user, the action instruction corresponding to the recognized action information may be inquired from the personal action database of the user, and then the operation corresponding to the action instruction may be executed. The action instruction corresponding to the action information about the user is defined in the personal action database, so when an operation on the application is made by the user with a gesture, it is able for the user to execute the action instruction with his familiar action no matter how an action corresponding to the action instruction is defined in the application, thereby to improve the user experience.

Figure 7:
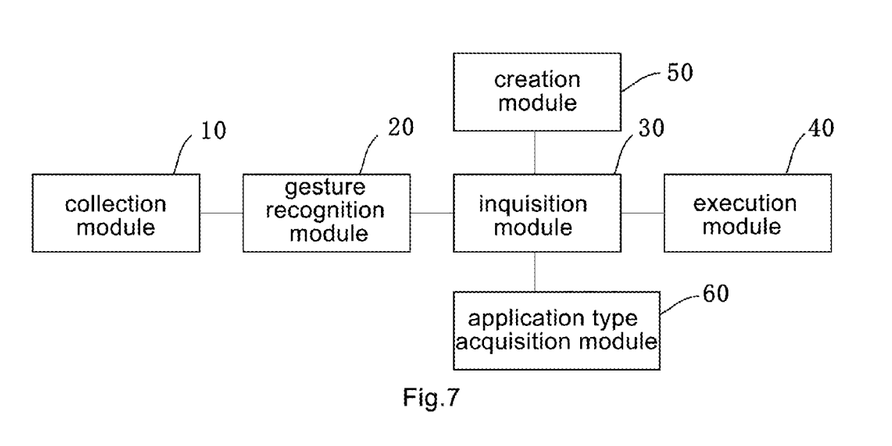
FIG. 7 is another schematic view showing the gesture recognition system according to one embodiment of the present disclosure.

Alternatively, as shown in FIG. 7, the gesture recognition system further includes a creation module 50 configured to create the personal action database of the user.

Alternatively, information about an application type is further stored in the personal action database of the user, and for different application types, the same action information about the user corresponds to different action instructions. The gesture recognition system further includes an application type acquisition module 60 configured to acquire information about a type of an application used by the user. At this time, the inquisition module 30 is further configured to inquire the action instruction corresponding to the recognized action information from the personal action database of the user in accordance with the information about the application type.

The above modules may be arranged in a terminal device 1 where the application is applied. Alternatively, the collection module 10, the gesture recognition module 20 and the execution module 40 may be arranged in the terminal device 1, while the inquisition module 30 may be arranged in a wearable device 2.

Figure 8:
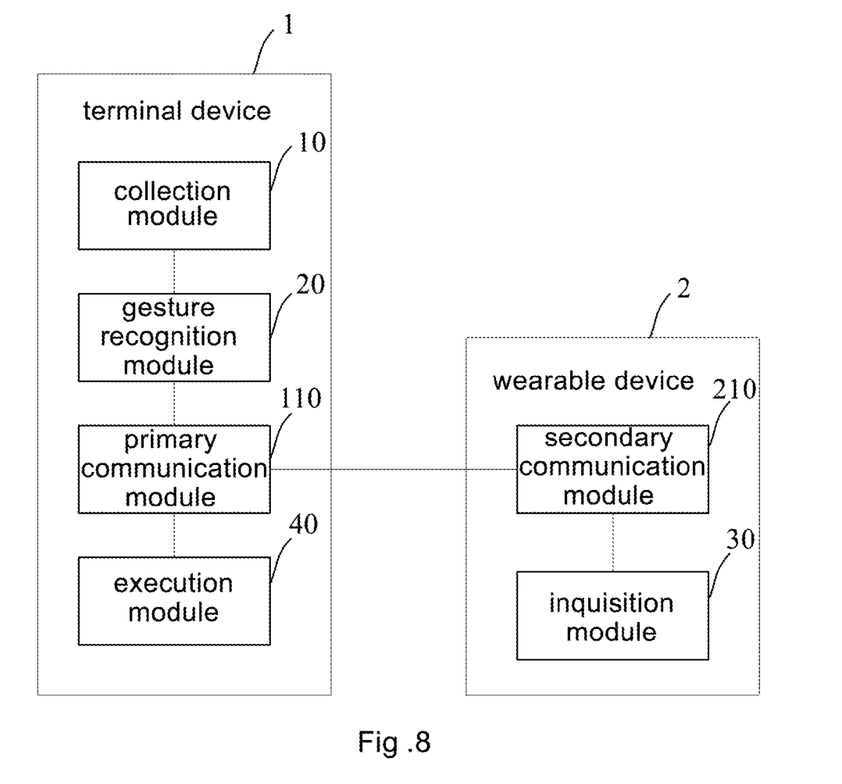
FIG. 8 is yet another schematic view showing the gesture recognition system according to one embodiment of the present disclosure.

Referring to FIG. 8, which is yet another schematic view showing the gesture recognition system according to one embodiment of the present disclosure, the gesture recognition system may include a terminal device 1 and a wearable device 2. The terminal device 1 includes a collection module 10, a gesture recognition module 20, a primary communication module 110 and an execution module 40, and the wearable device 2 includes a secondary communication module 210 and an inquisition module 30.

The collection module is configured to collect action information about a user. The gesture recognition module is connected to the collection module and configured to recognize the action information. The primary communication module is connected to the gesture recognition module and configured to transmit the recognized action information to the secondary communication module. The secondary communication module is connected to the primary communication module and configured to receive the recognized action information from the primary communication module. The inquisition module is connected to the secondary communication module and configured to inquire an action instruction corresponding to the recognized action information from a person action database of the user, and a correspondence between the action information about the user and the action instruction is stored in the personal action database of the user. The secondary communication module is further configured to transmit the action instruction inquired by the inquisition module to the primary communication module. The primary communication module is further configured to receive the inquired action instruction from the secondary communication module. The execution module is connected to the primary communication module and configured to execute an operation corresponding to the inquired action instruction.

Referring to FIG. 9, which is still yet another schematic view showing the gesture recognition system according to one embodiment of the present disclosure, the gesture recognition system includes a terminal device 1 and a wearable device 2. The terminal device 1 includes a gesture recognition module 20, a primary communication module 110 and an execution module 40, and the wearable device 2 includes a collection module 10, a secondary communication module 210 and an inquisition module 30.

The collection module is configured to collect action information about a user. The secondary communication module is connected to the collection module and configured to transmit the collected action information to the primary communication module. The primary communication module is configured to receive the action information from the secondary communication module. The gesture recognition module is connected to the primary communication module and configured to recognize the action information. The primary communication module is further configured to transmit the recognized action information to the secondary communication module. The secondary communication module is further configured to receive the recognized action information from the primary communication module. The inquisition module is connected to the secondary communication module and configured to inquire an action instruction corresponding to the recognized action information from a personal action database of the user, and a correspondence between the action information about the user and the action instruction is stored in the personal action database of the user. The secondary communication module is further configured to transmit the action instruction inquired by the inquisition module to the primary communication module. The primary communication module is further configured to receive the inquired action instruction from the secondary communication module. The execution module is connected to the primary communication module and configured to execute an operation corresponding to the inquired action instruction.

Figure 10:
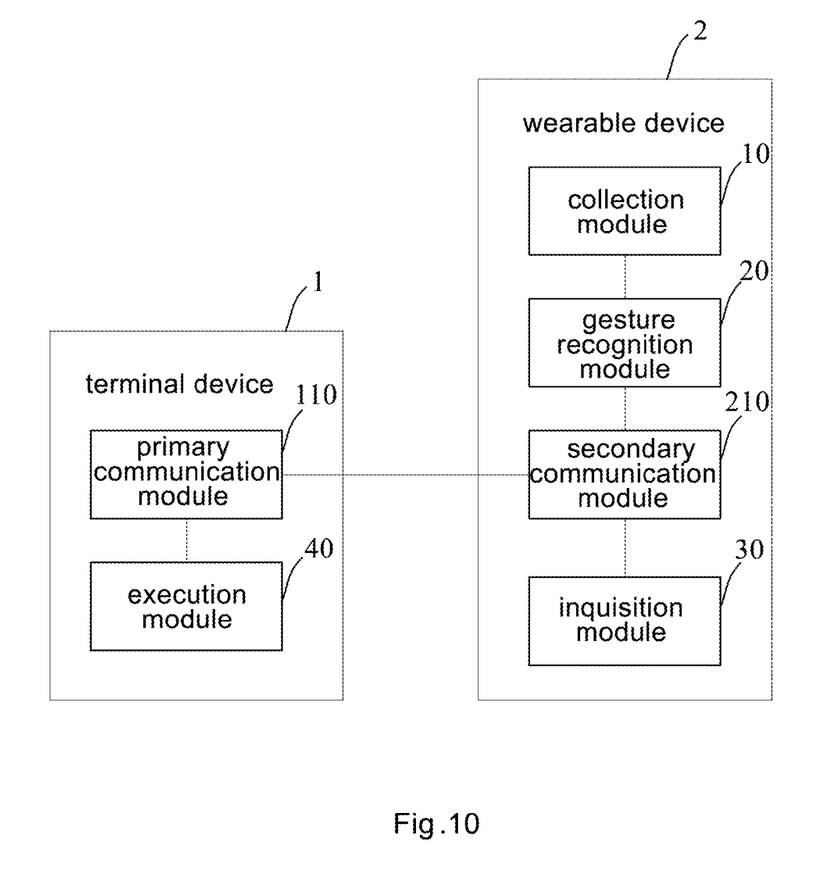
FIG. 10 is still yet another schematic view showing the gesture recognition system according to one embodiment of the present disclosure.

Referring to FIG. 10, which is still yet another schematic view showing the gesture recognition system according to one embodiment of the present disclosure, the gesture recognition system includes a terminal device 1 and a wearable device 2. The terminal device 1 includes a primary communication module 110 and an execution module 40, and the wearable device 2 includes a collection module 10, a gesture recognition module 20, a secondary communication module 210 and an inquisition module 30.

The collection module is configured to collection action information about a user. The gesture recognition module is connected to the collection module and configured to recognize the action information. The inquisition module is connected to the gesture recognition module and configured to inquire an action instruction corresponding to the recognized action information from a personal action database of the user, and a correspondence between the action information about the user and the action instruction is stored in the personal action database of the user. The secondary communication module is connected to the inquisition module and configured to transmit the action instruction inquired by the inquisition module to the primary communication module. The primary communication module is configured to receive the inquired action instruction from the secondary communication module. The execution module is connected to the primary communication module and configured to execute an operation corresponding to the inquired action instruction.

The present disclosure further provides in one embodiment a terminal device which includes:

a collection module configured to collect action information about a user;

a gesture recognition module configured to recognize the action information;

a primary communication module configured to transmit the recognized action information to a wearable device worn by the user so as to enable the wearable device to inquire an action instruction corresponding to the recognized action information from a personal action database of the user, a correspondence between the action information about the user and the action instruction being stored in the personal action database of the user; and an execution module configured to receive the inquired action instruction from the wearable device, and execute an operation corresponding to the action instruction.

The present disclosure further provides in one embodiment a wearable device, which includes:

a secondary communication module configured to receive recognized action information about a user from a terminal device; and an inquisition module configured to inquire an action instruction corresponding to the recognized action information from a personal action database of the user, a correspondence between the action information about the user and the action instruction being stored in the personal action database of the user.

The secondary communication module is further configured to transmit the inquired action instruction to the terminal device so as to enable the terminal device to execute an operation corresponding to the action instruction.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A gesture recognition method, comprising:
a collection step of collecting action information about a user;
a gesture recognition step of recognizing the action information;
an inquisition step of inquiring an action instruction corresponding to the recognized action information from a personal action database of the user, a correspondence between the action information about the user and the action instruction being stored in the personal action database of the user; and
an execution step of executing an operation corresponding to the inquired action instruction,
wherein information about an application type is stored in the personal action database of the user, the gesture recognition method further comprises, prior to the inquisition step, a step of acquiring the information about the application type, the information about the application type indicating a type of an application used by the user, and the inquisition step further comprises inquiring the action instruction corresponding to the recognized action information from the personal action database of the user in accordance with the information about the application type.

2. The gesture recognition method according to claim 1, further comprising, prior to the inquisition step, a step of creating the personal action database of the user.

3. The gesture recognition method according to claim 1, wherein for different application types, the same action information about the user corresponds to different action instructions.

4. The gesture recognition method according to claim 1, wherein the personal action database of the user is stored in a wearable device, and the inquisition step is executed by the wearable device.

5. The gesture recognition method according to claim 4, wherein the collection step, the gesture recognition step and the execution step are executed by a terminal device,
  subsequent to the gesture recognition step and prior to the inquisition step, the gesture recognition method further comprises transmitting by the terminal device the recognized action information to the wearable device, and
  subsequent to the inquisition step and prior to the execution step, the gesture recognition method further comprises transmitting by the wearable device the inquired action instruction to the terminal device.

6. A gesture recognition system, comprising:
a plurality of processors; and
a memory storing instructions, the instructions when executed by the plurality of processors, causing the plurality of processors to perform a gesture recognition method, the gesture recognition method comprising:
a collection step of collecting action information about a user;
a gesture recognition step of recognizing the action information;
an inquisition step of inquiring an action instruction corresponding to the recognized action information from a personal action database of the user, a correspondence between the action information about the user and the action instruction being stored in the personal action database of the user; and
an execution step of executing an operation corresponding to the inquired action instruction,
wherein information about an application type is stored in the personal action database of the user,
the gesture recognition method further comprises, prior to the inquisition step, a step of acquiring the information about the application type, the information about the application type indicating a type of an application used by the user, and
the inquisition step further comprises inquiring the action instruction corresponding to the recognized action information from the personal action database of the user in accordance with the information about the application type.

7. The gesture recognition system according to claim 6, the gesture recognition method further comprising, prior to the inquisition step, a step of creating the personal action database of the user.

8. The gesture recognition system according to claim 6, wherein for different application types, the same action information about the user corresponds to different action instructions.

9. The gesture recognition system according to claim 6, wherein a first processor of the plurality of processors is arranged in a wearable device, and the inquisition step is performed by the first processor.

10. The gesture recognition system according to claim 9, wherein a second processor of the plurality of processors is arranged in a terminal device, and the collection step, gesture recognition step and execution step are performed by the second processor,
  the second processor is further configured to transmit the recognized action information to the first processor, and
  the first processor is further configured to receive the recognized action information from the second processor and transmit the inquired action instruction to the second processor.

11. The gesture recognition system according to claim 6, wherein a first processor of the plurality of processors is arranged in a wearable device, and the inquisition step and collection step are performed by the first processor.

12. The gesture recognition system according to claim 11, wherein a second processor of the plurality of processors is arranged in a terminal device, and the gesture recognition step and execution step are performed by the second processor,
  the second processor is further configured to receive the action information from the first processor, transmit the recognized action information to the first processor, and receive the inquired action instruction from the first processor, and
  the first processor is further configured to transmit the collected action information to the second processor, receive the recognized action information from the second processor, and transmit the inquired action instruction to the second processor.

13. The gesture recognition system according to claim 6, wherein a first processor of the plurality of processors is arranged in a wearable device, and the collection step, inquisition step and collection step are performed by the first processor.

14. The gesture recognition system according to claim 13, wherein a second processor of the plurality of processors is arranged in a terminal device, and the execution step is performed by the second processor,
  the second processor is further configured to receive the action information from the first processor, and
  the first processor is further configured to transmit the inquired action instruction to the second processor.

15. A terminal device, comprising:
a processor; and
  a memory storing instructions, the instructions when executed by the processor, causing the processor to perform operations comprising:
  collecting action information about a user;
  recognizing the action information;
  transmitting the recognized action information to a wearable device worn by the user so as to enable the wearable device to inquire an action instruction corresponding to the recognized action information from a personal action database of the user, a correspondence between the action information about the user and the action instruction being stored in the personal action database of the user; and receiving the inquired action instruction from the wearable device, and executing an operation corresponding to the action instruction, wherein information about an application type is further stored in the personal action database of the user, the wearable device is further configure to acquire the information about the application type, the information about the application type indicating a type of an application used by the user; and to inquire the action instruction corresponding to the recognized action information from the personal action database of the user in accordance with the information about the application type.

16. A wearable device, comprising:

a processor; and a memory storing instructions, the instructions when executed by the processor, causing the processor to perform operations comprising:

receiving recognized action information about a user from a terminal device; and inquiring an action instruction corresponding to the recognized action information from a personal action database of the user, a correspondence between the action information about the user and the action instruction being stored in the personal action database of the user, wherein the processor is further configured to transmit the inquired action instruction to the terminal device so as to enable the terminal device to execute an operation corresponding to the action instruction, information about an application type is further stored in the personal action database of the user, the processor is further configured to acquire the information about the application type, the information about the application type indicating a type of an application used by the user; and to inquire the action instruction corresponding to the recognized action information from the personal action database of the user in accordance with the information about the application type.

\* \* \* \* \*